United States Patent [19]
Blumer et al.

[11] Patent Number: 5,555,358
[45] Date of Patent: Sep. 10, 1996

[54] DIGITAL PRINTING SYSTEM AND PROCESS USING COMPACT TRAPEZOIDAL REPRESENTATIONS

[75] Inventors: Thomas P. Blumer, Cambridge; Peter W. Barada, Amesbury, both of Mass.

[73] Assignee: Xionics Document Technologies, Inc., Burlington, Mass.

[21] Appl. No.: 501,518

[22] Filed: Jul. 12, 1995

Related U.S. Application Data

[63] Continuation of Ser. No. 024,532, Mar. 1, 1993.

[51] Int. Cl.⁶ .................................................. G06F 15/62
[52] U.S. Cl. ............................................................. 395/141
[58] Field of Search ................................... 395/133, 134, 395/142, 164, 166; 345/118, 121, 147, 132, 133

[56] References Cited

U.S. PATENT DOCUMENTS

| | | | |
|---|---|---|---|
| 4,872,064 | 10/1989 | Tutt et al. ............................ | 358/464 |
| 5,129,051 | 7/1992 | Cain ..................................... | 395/133 |
| 5,157,766 | 10/1992 | Butler et al. ........................ | 395/141 |
| 5,167,015 | 11/1992 | Bair et al. ........................... | 395/143 |
| 5,287,442 | 2/1994 | Alcorn et al. ....................... | 395/143 |

*Primary Examiner*—Phu K. Nguyen
*Attorney, Agent, or Firm*—Stuart P. Meyer

[57] ABSTRACT

A system and process for digital printing processes commands to draw a trapezoidal image by initially rendering those commands into an intermediate representation based on pixel rows. Depending on the dimensions of the trapezoid or the regularity of the offset of the end pixels of each pixel row from the end pixels of an adjacent pixel row, data representing the trapezoid are sent to a display list as either individual pixel data, pixel row data, or a compact grouping of data derived from the intermediate representation.

8 Claims, 6 Drawing Sheets

DIGITAL PRINTING SYSTEM AND PROCESS USING COMPACT TRAPEZOIDAL REPRESENTATIONS

RELATED APPLICATIONS

This is a continuation of application Ser. No. 08/024,532, filed on Mar. 1, 1993.

BACKGROUND AND FIELD OF THE INVENTION

This invention pertains generally to the field of digital printing systems, and specifically to a system and process of printing or otherwise displaying complex images using compact representations of trapezoidal image elements.

Conventional digital printing systems receive data corresponding to text and graphics in a variety of formats. These systems process such data to create a set of dots (or "pixels") on a page, which are perceived by a human observer as an image. It is conventional for such systems to represent image information in the memory of the printing system by setting a particular bit in the memory to be on or off depending upon whether a corresponding pixel is to be displayed as black or white. This is called a "bit map" or "pixel map" representation. In color systems, separate memory areas correspond to component colors. Typical computer video display systems similarly rely on pixel-based representations of images.

A conventional technique for processing images is to incorporate a microprocessor into a printing device, and to program the microprocessor to interpret commands from an attached computer in accordance with the protocols of a page description language. Such subsystems are commonly known as "interpreters", and translate the printing commands from the attached computer into commands and data more easily processed by the printing device.

In practice, it is common for interpreters to decompose high-level commands corresponding to complex images into low-level commands representing, for instance, a collection of contiguous trapezoids and other "graphic primitives". For purposes herein, a trapezoid is defined as a closed plane figure bounded by two parallel straight line segments and two additional non-intersecting line segments, each of the additional line segments connecting an endpoint of one of the parallel line segments with an endpoint of the other parallel line segment. Typically, the trapezoids that interpreters produce in the decomposition process have horizontal parallel sides. For example, U.S. Pat. Nos. 5,133,049 and 5,129,051 teach techniques for decomposing an arbitrary polygon into trapezoids for more efficient processing.

Two system architectures are commonly used in the industry for further processing of the low-level commands produced by page description language interpreters. The first, known as a "frame buffer", represents every pixel on a printed page as a separate bit or, in the case of color, as a set of bits in random access memory (RAM). Under this system, any page that can be described as a map of pixels can be printed. Frame buffer systems typically must process the information to be displayed on a frame-by-frame basis in which each frame must be rasterized and the data therein sent serially to the print engine. Furthermore, a substantial amount of frame buffer RAM is required to store information for the page, even when the image to be printed is extremely simple.

The second common architecture, known as "banding", stores all of the graphic primitives to be printed on the page, such as characters, graphics, images, and the like, in one or more display lists stored in the RAM of the printing system. Each display list stores the graphic primitives for one area of the page, typically a horizontal band. Each display list is rasterized in turn into one of a small number of band bit maps, or buffers, the contents of which are sent in turn to the print engine. The band buffers are reused during the processing of all the display lists of the page. Typically, most of the rasterization into band bit maps occurs after the print engine has started to print the page. In the typical laser printer, the engine cannot be stopped in the middle of a page, so this rasterization must be fast enough to keep up with the print engine. In banding systems, relatively little RAM is required to print simple pages, and processing of one page while another page is printing is possible. However, for very complex images the size of the lists can exceed the RAM size of a comparable frame buffer system. Sufficient RAM for handling such complex images must be provided or an error will result. The requirement of real time rasterization of bands is often difficult to achieve, and an error will result if a band fails to rasterize by the time it is called for. The addition of RAM to banding systems can allow them to be converted to frame buffer systems when required.

One contributing factor to the cost and complexity of banding systems is that display list entries can quickly accumulate to an unmanageable size, not only eliminating the primary advantage of this technique but also giving rise to the possibility that not enough RAM will be available to store all of the desired display list entries. For instance, large numbers of trapezoids are created by conventional techniques, such as those taught in the U.S. patents mentioned above, and each must be stored in a display list.

In one conventional system, the representation of a trapezoid includes a set of fixed- or floating-point real-valued coordinates, in a predetermined coordinate system, for each of the four vertices of the trapezoid. In another conventional system, the representation of a trapezoid includes a set of real-valued coordinates for each of the top two vertices (assuming a trapezoid with parallel sides that are horizontal), the real-valued height of the trapezoid, and a real-valued slope for each of the non-horizontal sides of the trapezoid.

To obtain sufficient accuracy in representing the trapezoid, all of these values in the conventional systems are stored in a fixed- or floating-point mathematical format to represent a real value. Representation of such real values is extremely memory-intensive compared to storing integer values, and the conversion of real-valued display list entries into the pixel-based representations needed for printing requires a significant amount of processing time.

Thus, for complex images that are decomposed into a large number of trapezoids, the representations of such trapezoids can consume a large amount of display list memory and take a long time to process at the critical point when display list entries are rendered into band bit maps. It would be desirable to have a system and process for storing representations of such trapezoids as display list entries that are more compact and faster to process than those produced using conventional techniques.

SUMMARY OF THE INVENTION

In accordance with the present invention, a command to draw a trapezoid on a computer display device is stored in a compact manner by first rendering the command into a temporary representation of the trapezoid as a series of rows of pixels, determining the integer-valued horizontal locations (or bit-map addresses) of the upper left and upper right pixels of the trapezoid, determining the integer-valued vertical location (or bit-map address) of the top row, determining the number of pixel rows of the trapezoid, and determining, for each row of the representation, (a) an x1 horizontal offset between the left-most pixel of the current row and the left-most pixel of the next lower row, and (b) an x2 horizontal offset between the right-most pixel of the current row and the right-most pixel of the next lower row. If the x1 offsets thus obtained are exactly equal, and the x2 offsets are also exactly equal, the trapezoid is represented by a display list entry consisting of a single byte indicating this type of trapezoid, the integer-valued horizontal locations of the upper left and upper right pixels of the trapezoid, the integer-valued vertical location of the top row of the trapezoid, the number of rows in the trapezoid, and the x1 and x2 offsets m and n, respectively.

If either the x1 or x2 offsets for each row are not exactly equal, but neither the set of x1 offsets nor the set of x2 offsets varies by more than one (i.e., each x1 offset value equaling either m or m+1 and each x2 offset value equaling either n or n+1), a set of deltas will be established to indicate the offset applicable to each row. For example, if the x1 offset for each row of a given trapezoid is either 2 or 3, an x1 delta value of 0 is assigned to each row having an x1 offset equal to 2, and an x1 delta value of 1 is assigned to each row having an x1 offset equal to 3. If only the x1 offsets are unequal, no set of deltas is established for the x2 offset. Similarly, if only the x2 offsets are unequal, no set of deltas is established for the x1 offset.

A trapezoid having such deltas is represented by a display list entry consisting of a single identifying byte indicating that this is a trapezoid having x1 deltas, x2 deltas, or both (as appropriate), the integer-valued horizontal locations of the upper left and upper right pixels of the trapezoid, the integer-valued vertical location of the top row of the trapezoid, the number of rows in the trapezoid, the x1 offset or the lower of the two x1 offsets if the x1 offsets are not all equal, the x2 offset or the lower of the two x2 offsets if the x2 offsets are not all equal, and the set or sets of deltas previously established.

If the x1 offsets for the trapezoid are not limited to two adjacent integer values m and m+1, or if the x2 offsets thus obtained are not limited to two adjacent integer values n and n+1, the trapezoid is processed differently. In one aspect of the invention, if the x1 or x2 offsets vary by more than one, the trapezoid is examined to determine whether decomposing the trapezoid into a sub-trapezoid by stripping the top and/or bottom rows of pixels will result in a subtrapezoid having x1 offsets not varying by more than one and x2 offsets not varying by more than one. If so, the trapezoid is decomposed in this manner, commands to draw the stripped row or rows of pixels as horizontal lines are written to the display list, and the sub-trapezoid is processed and represented in the same manner as described above by writing a display list entry consisting of the integer-valued horizontal locations of the upper left and upper right pixels of the sub-trapezoid, the integer-valued vertical location of the top row of the sub-trapezoid, the number of rows in the sub-trapezoid, the x1 offset or the lower of the two x1 offsets if the x1 offsets are not all equal, the x2 offset or the lower of the two x2 offsets if the x2 offsets are not all equal, and, if applicable, the set or sets of deltas. If, on the other hand, the sub-trapezoid still has x1 offsets varying by more than one or x2 offsets varying by more than one, the entire trapezoid is represented as a series of horizontal lines, and commands to draw those lines are written to the display list.

In another aspect of the invention, trapezoids or other small figures having dimensions smaller than a predetermined, or adaptively determined, threshold size are processed by writing a display list entry consisting of a bit-map representation of the figure.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

In order to describe the preferred embodiment, it may be helpful to first define the terms "high level command" and "graphic primitive".

High level commands are the graphics commands of a page description language such as the "PCL" or "POSTSCRIPT" page description languages of Hewlett-Packard Co. and Adobe Systems, Inc., respectively. An example sequence of high level commands to draw a polygon is:

4.113 12.237 MOVETO 8.000 12.237 LINETO 9.000 17.203 LINETO 1.000 17.203 LINETO

CLOSEPATH

FILL

Graphic primitives are printing commands that are produced by a page description language interpreter from high level commands and are later rendered into pixels by a marking mechanism. Each graphic primitive specifies a particular shape at a particular location on the page. Examples are:

X Lines: An X Line primitive draws a horizontal line of length N, starting at a particular position (X,Y).

Trapezoid: A Trapezoid primitive draws a trapezoid having two horizontal sides, starting at a vertical position (Y1), an upper left corner at Y1 having a horizontal position (X1), an upper right corner at Y1 having a horizontal position (X2), a height (H), a left side slope (ΔX1), and a right side slope (ΔX2), where all values are typically expressed in a real-valued mathematical format.

Many other and different graphic primitives are commonly used. The above examples are well known to those practiced in the art. The present invention is not dependent on any particular graphic primitive or representation thereof.

Figure 1:
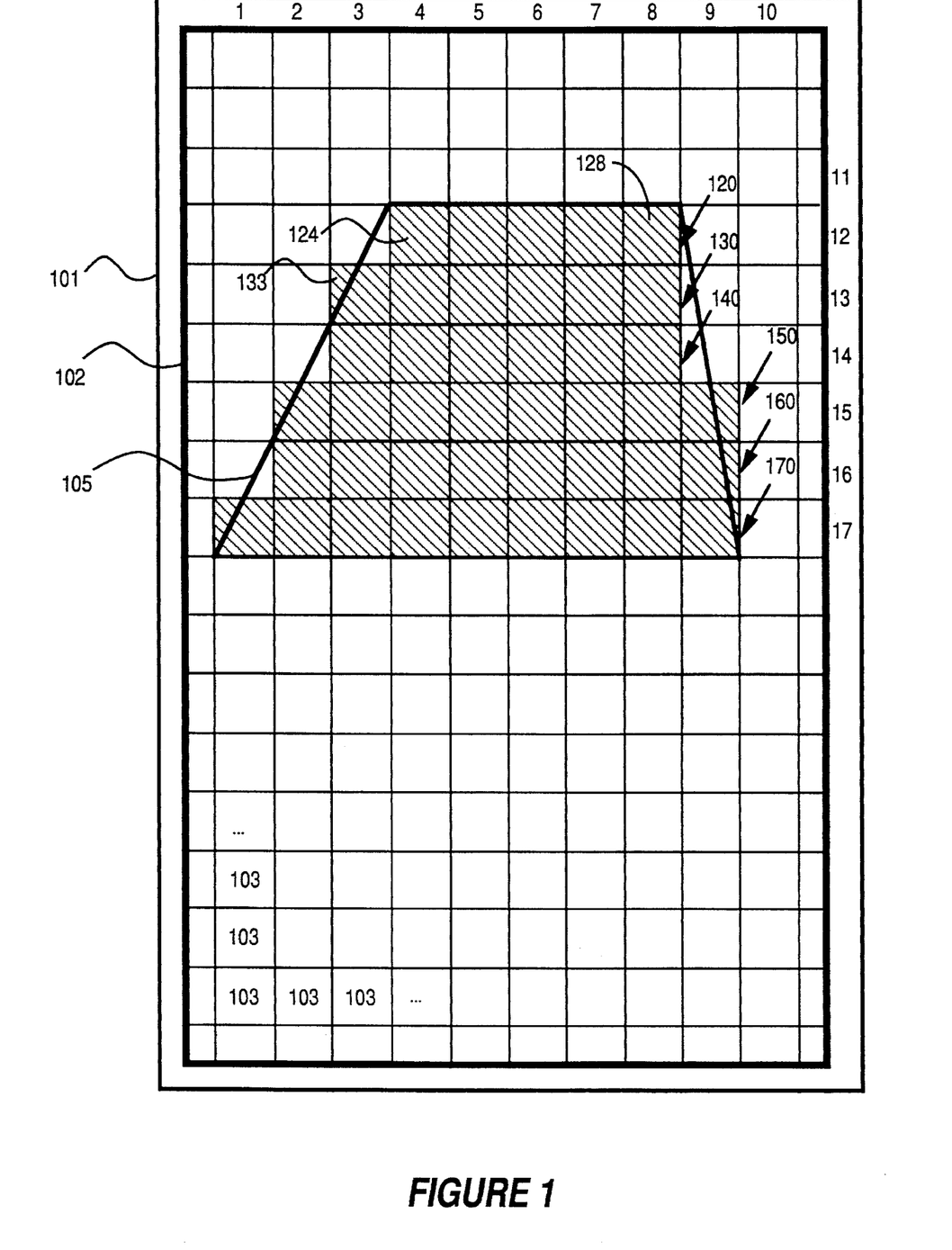
FIG. 1 is a diagram illustrating a representation of a trapezoid as a series of pixel rows, in accordance with the present invention.

Referring now to FIG. 1, there is shown a representation of a trapezoid 105 in accordance with the present invention. A physical page 101 has a predefined imagable area 102. In accordance with the present invention, the imagable area 102 is divided into a grid of pixels 103. For purposes of illustration, the pixels 103 of FIG. 1 are shown as fairly large, contiguous squares, but in practice pixels are usually much smaller. For instance, a typical video display device may have on the order of 80 pixels per inch in each of the vertical and horizontal dimensions, while common laser printers may have pixel densities as high as 2400 pixels per inch in each dimension.

Referring still to FIG. 1, a representation of a trapezoid 105 is obtained by rendering the command corresponding to the trapezoid into a grouping of pixel rows 120–170. In accordance with the present invention, the trapezoid 105 is represented by storing on a display list (discussed in greater detail below), the vertical position (12) of the top-most row 120, the horizontal position (4) of the upper-left-most pixel 124, the horizontal position (8) of the upper-right-most pixel 128, and the number of pixel rows in the representation (6). In addition, since the x1 offset, defined as the change in horizontal position of the left-most pixel in the current row to the left-most pixel in the next lower row, varies between −1 and 0 over rows 120–170, and the x2 offset, defined as the change in horizontal position of the right-most pixel in the current row to the right-most pixel in the next lower row, varies between 0 and 1, the trapezoid 105 is also represented by the minimum x1 offset (−1), a set of x1 deltas indicating for each row whether the x1 offset to the next lower row is the smaller of the two x1 offsets (−1) or the larger (0), the minimum x2 offset (0), and a set of x2 deltas indicating for each row whether the x2 offset to the next lower row is the smaller of the two x2 offsets (0) or the larger (1). In this case, the set of x1 deltas would be (0,1,0,1,0) and the set of x2 deltas would be (0,0,1,0,0). Thus, the trapezoid may be completely represented by the following information:

vertical location of first row: 12 {integer} horizontal location of upper-left pixel: 4 {integer} horizontal location of upper-right pixel: 8 {integer} number of rows: 6 {integer } minimum x1 offset: −1 {integer} x1 deltas: 0,1,0,1,0 {integer or boolean} minimum x2 offset: 0 {integer} x2 deltas: 0,0,1,0,0 {integer or boolean}

It will be obvious to those skilled in the art that this information may be encoded in an extremely compact fashion by identifying the display list entry by a unique byte to indicate that the data to follow is for a trapezoid, and whether this trapezoid has x1 deltas, x2 deltas, or both. Thus, for instance, using the order of data presented above, the trapezoid of FIG. 1 is completely represented by the following data:

[identifying byte for trapezoid with x1 & x2 deltas], 12,4,8,6,−1,0,1,0,1,0,0,0,0,1,0,0

In practice, such a representation is found to be far more compact than conventional commands based on real-valued vertex or slope data. Furthermore, because the display list entries are already in a pixel-based rather than a real-value form, they take relatively less time to process than conventional display list entries.

Figure 2:
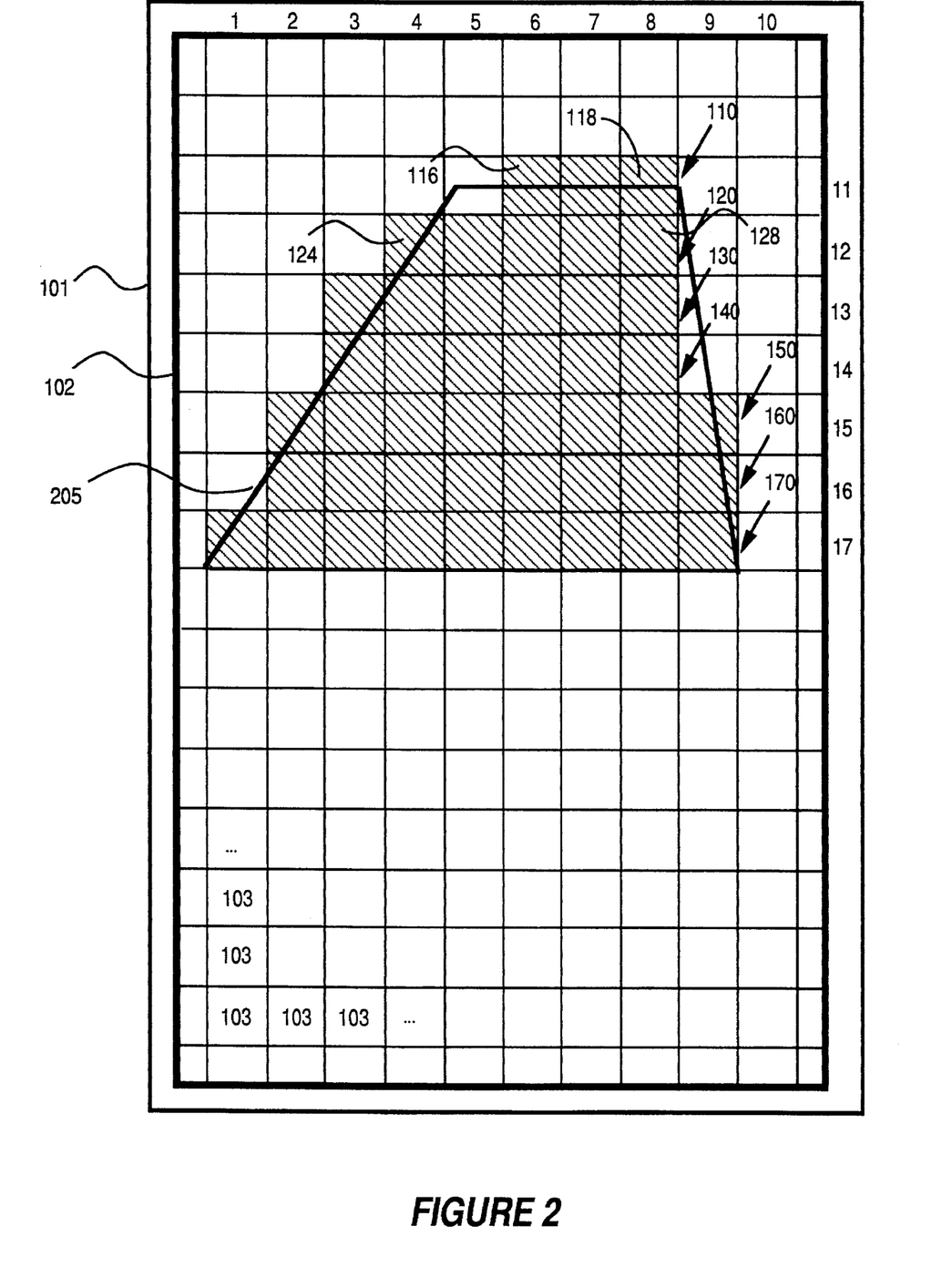
FIG. 2 is a diagram illustrating a second representation of a trapezoid as a series of pixel rows, in accordance with the present invention.

Referring now to FIG. 2, there is shown a representation of another trapezoid 205. As in FIG. 1, FIG. 2 illustrates a physical page 101 with a predefined imagable area 102 divided into a grid of pixels 103. In accordance with the present invention, trapezoid 205 is represented by rows of pixels 110–170. Unlike trapezoid 105 of FIG. 1, the x1 offsets for trapezoid 205 range from −2 (e.g., between rows 110 and 120) to 0 (e.g., between rows 130 and 140). In cases where the top or bottom of a figure does not fall exactly on pixel boundaries, but covers only a small portion of a row of pixels, it is typical for conventional page description language interpreters representing that figure to reduce the number of marked pixels in that row of pixels to provide a more pleasing image. Thus, although trapezoid 205 has a regular slope, the pixel representation called for in accordance with the page description language being used may require fewer pixels to be marked in row 110 than would be marked if trapezoid 205 extended to the top of row 110.

Thus, in accordance with the present invention, trapezoid 205 is represented by first determining whether a sub-trapezoid formed by stripping either top row 110, bottom row 170, or both would have x1 offsets varying by no more than one and x2 offsets varying by no more than one. Since stripping the top row 110 of trapezoid 205 results in a trapezoid identical to trapezoid 105 illustrated in FIG. 1, the determination is that the sub-trapezoid would have such constrained x1 and x2 offsets. Thus, the process of representing trapezoid 205 continues by stripping top row 110 from trapezoid 205, and representing it conventionally as a horizontal line, for instance as follows:

Top Line:

vertical location: 11 horizontal starting location: 6 length: 3

Next, in accordance with the present invention, the subtrapezoid that remains (comprising rows 120 through 170) is represented as described above in connection with FIG. 1. Specifically, the sub-trapezoid is represented by the following information:

vertical location of first row: 12 {integer} horizontal location of upper-left pixel: 4 {integer} horizontal location of upper-right pixel: 8 {integer} number of rows: 6 {integer} minimum x1 offset: −1 {integer} x1 deltas: 0,1,0,1,0 {integer or boolean} minimum x2 offset: 0 {integer} x2 deltas: 0,0,1,0,0 {integer or boolean}

Thus, the entire trapezoid 205 is represented by the following display list entries:

[identifying byte for horizontal line], 11, 6, 3

[identifying byte for trapezoid with x1 & x2 deltas], 12,4,8,6,−1,0,1,0,1,0,0,0,0,1,0,0

As mentioned above, where a sub-trapezoid formed by stripping the top, bottom, or top and bottom rows is found to have x1 or x2 offsets that vary by more than one, the entire trapezoid is represented by horizontal line commands. Using the trapezoid 205 to illustrate, a trapezoid would thus be represented as:

[identifying byte for horizontal line], 11,6,3

[identifying byte for horizontal line], 12,4,5
[identifying byte for horizontal line], 13,3,6
[identifying byte for horizontal line], 14,3,6
[identifying byte for horizontal line], 15,2,8
[identifying byte for horizontal line], 16,2,8
[identifying byte for horizontal line], 17,1,9

It should be remembered that the above compact representations require only that the x1 and x2 offsets be constrained in some way, not that they have any particular value. For instance, if the x1 offset values in FIG. 2 were {−9, −10, −10, −9, −10, −9} and the x2 offset values were {7, 7, 6, 7, 7, 7}, compact representations in accordance with the invention could still be formed.

Those skilled in the art will recognize that the technique described above in connection with FIG. 2 provides advantages with respect to figures other than just trapezoids. The technique may also be employed advantageously to provide a pixel representation of other plane figures, such as pentagons, hexagons, and even figures with curved portions, as long as the pixel-row representations of those figures have the characteristics described above in connection with FIG. 2, i.e., x1 and x2 offsets varying by no more than one. Where offsets are constrained to other ranges, multi-bit deltas may similarly be used. Similar representations may be used for other polygons, and for figures, such as circles, that are typically represented by computer systems as polygons. Many computer systems represent a circle as a polygon with a large number of small sides. One possible technique for representing such higher-order polygons is to define a set of regions in the polygon by dividing the polygon with horizontal lines drawn at each vertex of the polygon. A set of offsets and deltas may then be defined for each region so formed.

In an alternate embodiment, a check may be made to determine whether the one edge of a first trapezoid is defined by the same horizontal line as an edge of a second trapezoid. For instance, in the case of two adjacent trapezoids, one on top of the other, the bottom edge of the upper trapezoid may be the same as the top edge of the lower trapezoid. In that case, a representation of the trapezoids may be made even more compact by defining one edge of the second trapezoid by the information already obtained about the identical edge of the first trapezoid, thus reducing the computations required. This technique may be employed to particular advantage where polygons are decomposed into a set of contiguous trapezoids, as discussed above.

Figure 3:
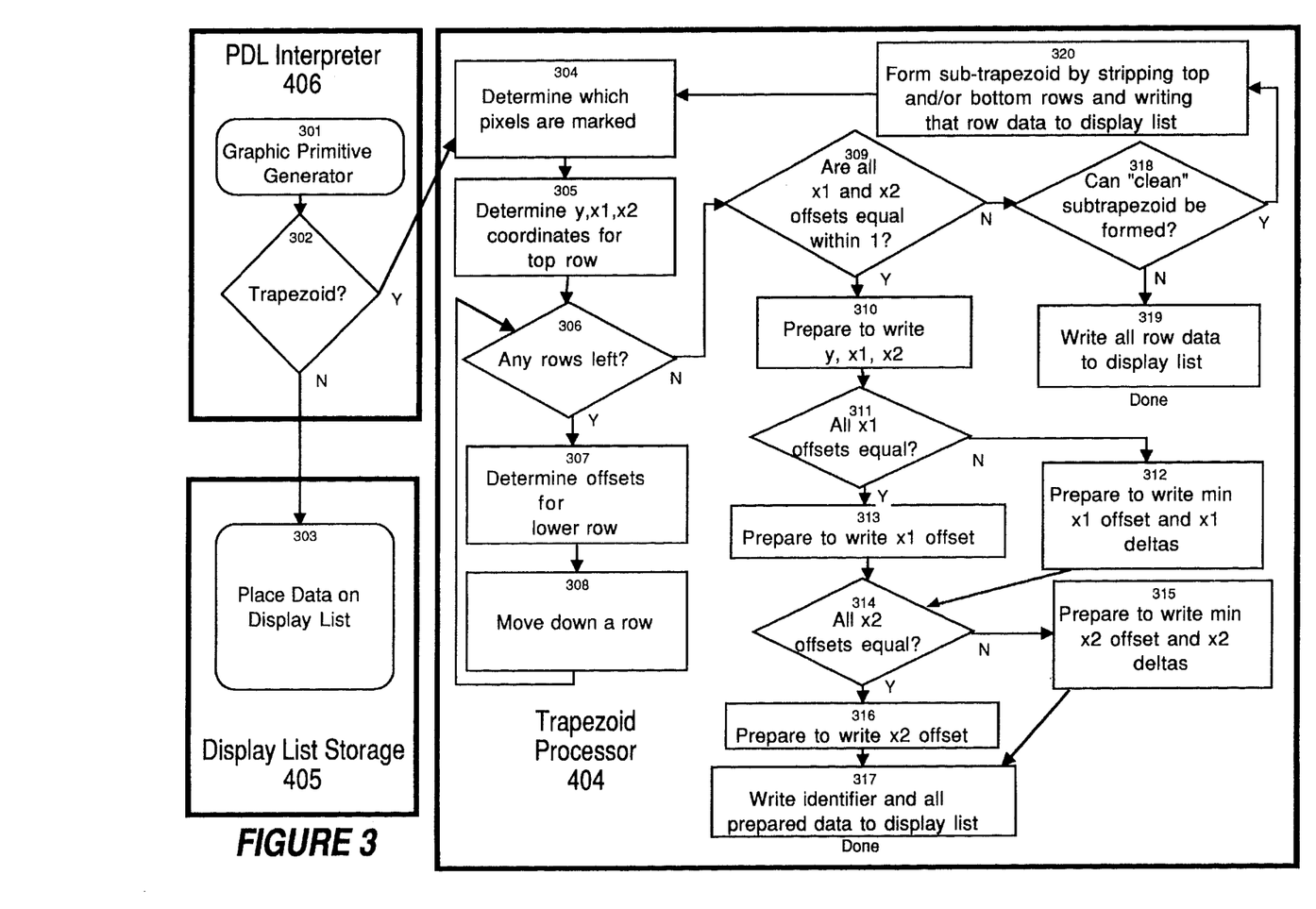
FIG. 3 is a functional block diagram of a page description language interpreter subsystem, a trapezoid processor subsystem, and a display list storage subsystem in accordance with the present invention.

Referring now to FIG. 3, there is shown a functional block diagram illustrating the processes performed by a preferred embodiment of the present invention. For notational convenience, the functions performed in this embodiment are grouped into three subsystems. Functional blocks 301 and 302 are described as page description language interpreter subsystem 406, functional block 303 is described as display list storage 405, and functional blocks 304 through 320 are described as trapezoid processor 404.

The flow begins within the page description language interpreter subsystem 406. In step 301, the interpreter subsystem 406 breaks a stream of high level commands into a stream of graphic primitives.

In step 302, a check is made to see if the graphic primitive generated in step 301 is for a trapezoid. If not, the graphic primitive is conventionally stored in the display list storage subsystem 405 in step 303.

If the check of step 302 reveals that the graphic primitive is a trapezoid, processing flows to the trapezoid processor subsystem 404. There, step 304 first determines which pixels would be marked if the trapezoid command were rendered into a pixel bit map, as shown for instance in FIGS. 1 and 2. Next, the integer vertical location of the top row (y) and the integer horizontal locations of the top left and top right pixels of the trapezoid (x1 and x2, respectively) are determined in step 305. Steps 306 through 308 then determine the x1 and x2 offsets for each row of the representation, moving down a row at a time, until there are no more rows to process. Processing then moves to step 309, where a check is made to see whether the x1 offsets and the x2 offsets are equal within one (i.e., the x1 offsets do not vary by more than one, and the x2 offsets do not vary by more than one). If so, step 310 prepares to write the y value, the x1 value, and the x2 value to the display list storage subsystem 405. Note that for the sake of clarity, no flow lines are shown between processing steps in trapezoid processor subsystem 404 and display list storage subsystem 405.

Following step 310, step 311 checks to see whether the x1 offsets are all exactly equal. If so, the x1 offset is prepared to be written to the display list storage subsystem 405 in step 313. Otherwise, processing moves to step 312 where the minimum x1 offset and the set of x1 deltas are prepared to be written to the display list storage subsystem 405.

Processing then moves to steps 314–316, where the x2 offset and, if appropriate, x2 deltas are similarly prepared to be written to the display list storage subsystem 405.

Finally, at step 317, the y, x1, x2, offsets, and possibly deltas are written to the display list storage subsystem 405, preceded by a unique initial display list "identifier" byte to indicate whether the current case is one having no deltas, x1 deltas only, x2 deltas only, or both x1 and x2 deltas. Processing is then complete.

If the check in step 309 reveals that the x1 or x2 offsets vary by more than one, a check is made in step 318 to determine whether the trapezoid being processed can be decomposed by stripping the top, bottom, or top and bottom rows to form a "clean" sub-trapezoid, i.e., a sub-trapezoid whose x1 offsets vary by no more than one and x2 offsets vary by no more than one. If so, a sub-trapezoid is formed from the current trapezoid in step 320 by stripping the top, bottom, or top and bottom rows of pixels from the current trapezoid and writing horizontal line representations of the stripped row or rows to the display list storage subsystem 405, and processing flows back to step 304 for further processing of the sub-trapezoid. If the check in step 318 reveals that the trapezoid being processed would not decompose into a "clean" sub-trapezoid, then horizontal line representations of all of the rows of the trapezoid are written to the display list storage subsystem 405 in step 319 and processing is complete.

Figure 4:
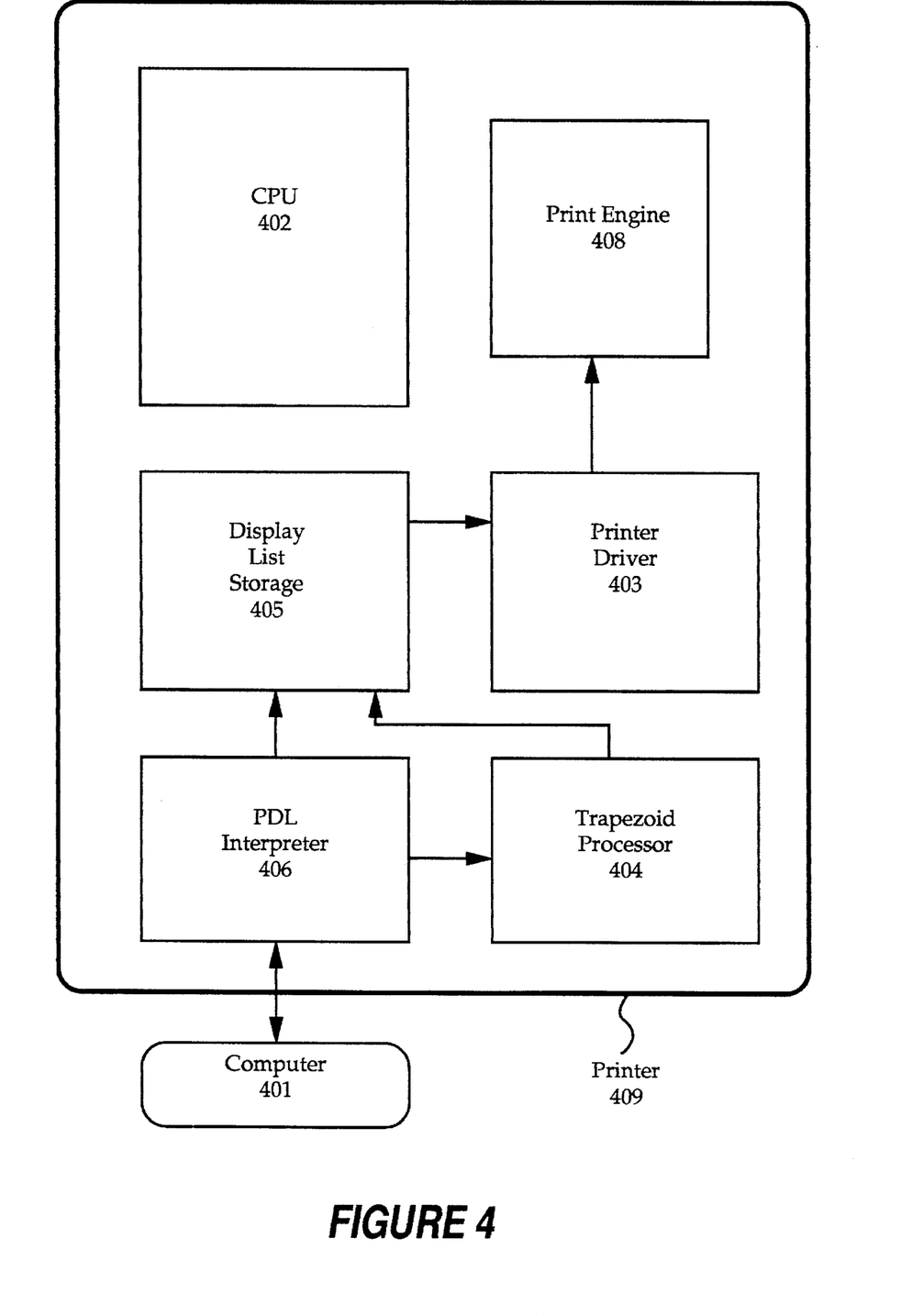
FIG. 4 is a functional block diagram of a printer in accordance with the present invention.

Referring now to FIG. 4, there is shown a functional block diagram of a printer 409 in accordance with the present invention. The printer 409 includes CPU 402, print engine 408, display list storage 405, trapezoid processor 404, printer driver 403, and page description language interpreter subsystem 406. CPU 402 is shown using a dotted line to indicate that it may or may not be used to implement printer driver 403, trapezoid processor 404, display list storage 405, or interpreter subsystem 406. The printer 409 may be of any kind, including laser, ink jet, thermal transfer, or dot matrix. As previously mentioned, in accordance with the invention the display device labeled "printer" 409 could actually be any computer display device, for instance a plotter or even a video display. The printer 409 is connected to a computer 401 via a conventional interface, such as SCSI, RS232, "AppleTalk", or Centronics interfaces. As mentioned above, the trapezoid processor 404, printer driver 403, and page description language interpreter subsystem 406 need not each be separate physical devices, but may be implemented as logical devices through stored computer programs operating on CPU 402. The display list storage 405 may be a portion of the general purpose RAM of printer 409, and may actually be implemented by RAM associated with CPU 402. The CPU 402 is of conventional design, for instance an AMD 29000, Intel 80960, Intel '386, National Semiconductor 32cg16, Motorola 68020, or Motorola 68000. The only requirement for the CPU 402 is that if it is used to drive a print engine 408 that has a real time data requirement, it must be able to process display list entries quickly enough to meet the data requirements of the engine 408. Thus, a system in accordance with the present invention can be implemented either with dedicated electronic circuitry or through the use of stored programs controlling conventional printers.

In the preferred embodiment, a conventional, unmodified printer is used to provide the hardware for functional elements 402, 403, 404, 405, 406 and 408. In the preferred embodiment, devices 402–406 are implemented on a printer controller board of conventional design. In accordance with the present invention, the functionality could also be implemented in other classes of devices such as workstations, personal computers, mainframe computers, and others. Such implementations are straightforward and can easily be performed by those skilled in the art.

The trapezoid processor 404 performs the tasks described in connection with steps 304–320 of FIG. 3. In the preferred embodiment, trapezoid processor 404 is implemented by a stored computer program in printer 409. Display list storage 405 performs the tasks described in step 303 of FIG. 3. In the preferred embodiment, the tasks of step 303 are implemented by a stored computer program in printer 409. Page description language interpreter subsystem 406 performs the tasks described in connection with steps 301 and 302 of FIG. 3. In the preferred embodiment, page description language interpreter subsystem 406 is implemented by a stored computer program in printer 409. The print engine 408 connected to printer driver 403 displays the image corresponding to the stored data. The elements shown in FIG. 4 operate as described in connection with FIG. 3, with the page description language interpreter subsystem 406 controlling the CPU 402 to generate graphic primitives and check for trapezoids. Trapezoid processor 404 processes such trapezoids, and page description language interpreter subsystem 406 and trapezoid processor 404 write commands onto display list storage 405 for final processing before being sent as print engine data to print engine 408.

Figure 5:
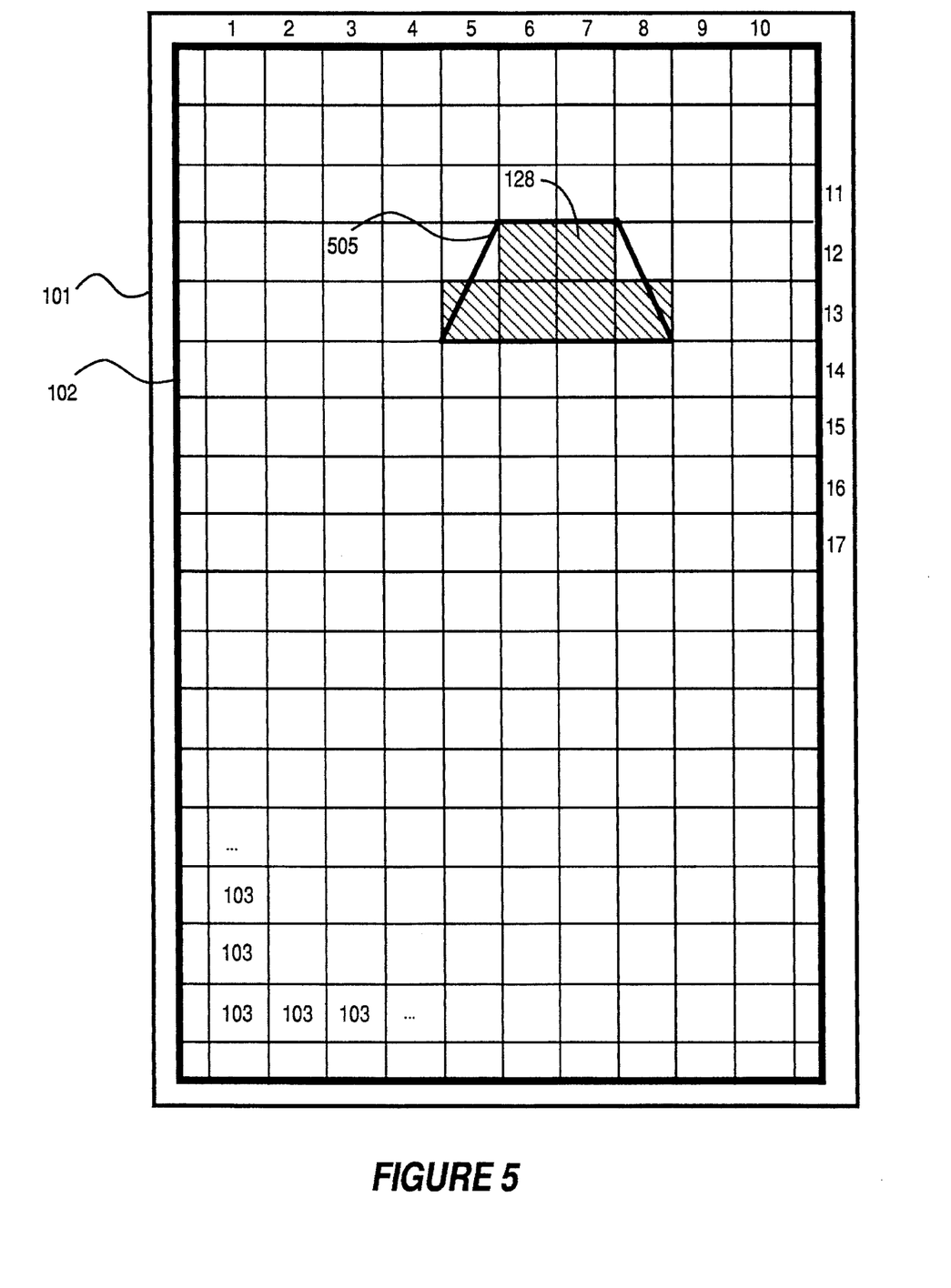
FIG. 5 is a diagram illustrating a representation of a small trapezoid, in accordance with the present invention.

Referring now to FIG. 5, there is shown a representation of a small trapezoid 505 in accordance with the present invention. As in FIGS. 1 and 2, FIG. 5 illustrates a physical page 101 with a predefined imagable area 102 divided into a grid of pixels 103. In accordance with the present invention, trapezoid 505 is represented by a map of individual pixels, e.g., 128.

Figure 6:
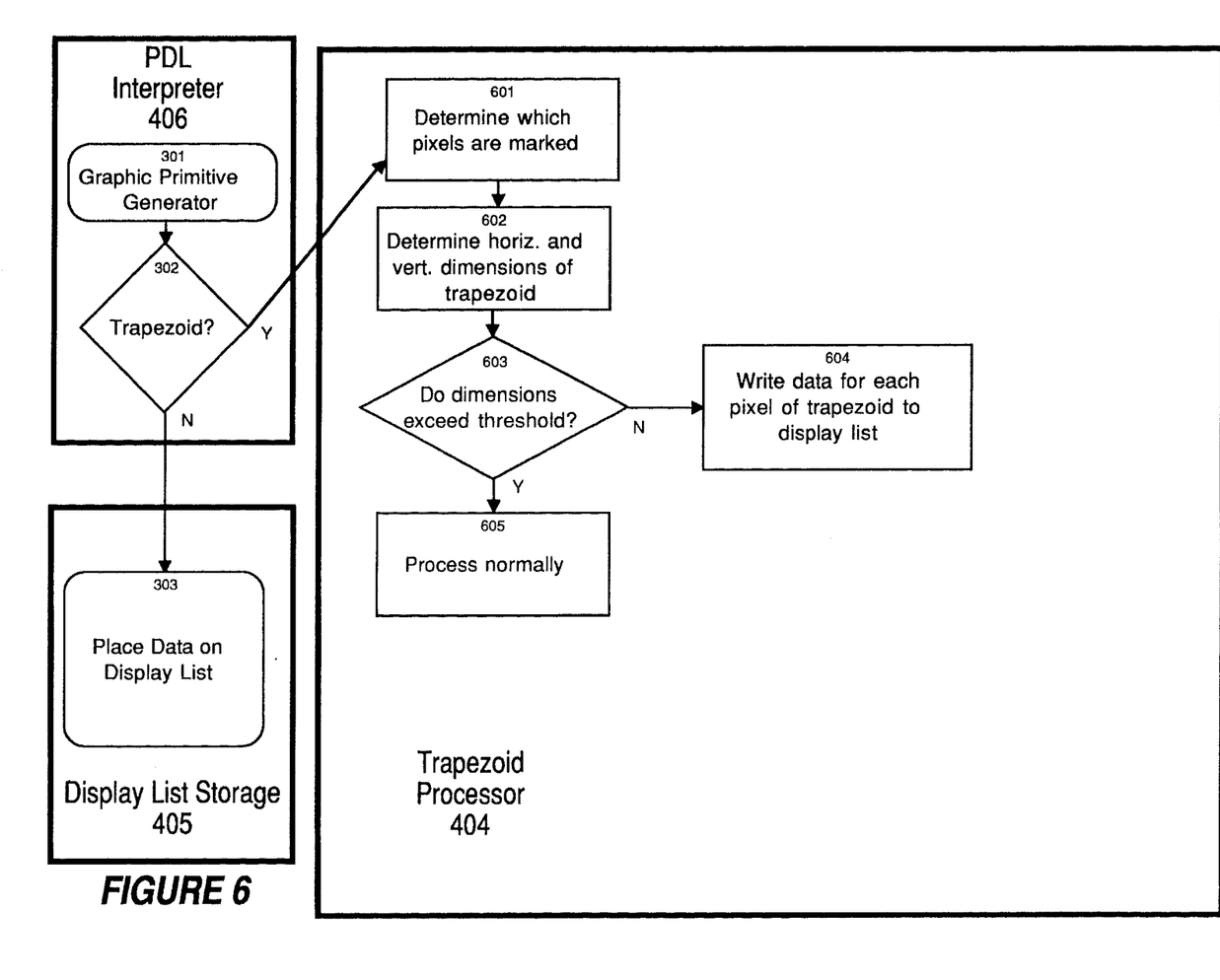
FIG. 6 is a functional block diagram of a page description language interpreter subsystem, a trapezoid processor subsystem, and a display list storage subsystem in an alternate embodiment, in accordance with the present invention.

Referring still to FIG. 5 and now also to FIG. 6, there is shown an alternate embodiment of a trapezoid processor subsystem 404 in accordance with the present invention. Page description language interpreter subsystem 406, display list storage subsystem 405, and associated processing steps 301–303 are identical to those described in connection with FIG. 3. In this embodiment, however, trapezoid processor 404 operates as follows: First, upon detection of a trapezoid by page description language subsystem 406 at step 302, processing by trapezoid processor 404 begins by determining at step 601 which pixels would be marked to represent trapezoid 505. That being accomplished, step 602 determines the vertical and horizontal dimensions of the trapezoid and step 603 checks to see whether the dimensions exceed predetermined threshold values. If so, the trapezoid is processed normally, as indicated by step 605. In one embodiment, such "normal" processing may involve further processing in accordance with the steps discussed in connection with FIG. 3. In another embodiment, such "normal" processing may involve simply transferring the original graphic primitive of the trapezoid generated at step 301 to the display list storage subsystem 405 via step 303. In this latter embodiment, there may be no need to perform step 601, as the dimensional determination may be made based on the graphic primitive itself. In yet another embodiment, the threshold could be set using adaptive criteria based on estimates of memory usage, performance metrics or other factors.

If the check in step 603 indicates that the dimensions of the trapezoid do not exceed the threshold limits, the trapezoid is represented as a map of individual pixels, and in step 604 a series of commands to mark such individual pixels is sent to display list storage subsystem 405 via step 303. In a preferred embodiment, if the number of pixel rows in the trapezoid does not exceed six and the width of the trapezoid does not exceed eight pixels, the display list entry will be a pixel-map representation.

In the example shown in FIG. 5, the information sent to display list storage subsystem 405 simply identifies the location of all of the constituent pixels of the trapezoid. Thus, assuming that pixels are addressed for purposes of discussion by a row address appended with a column address (i.e., since pixel 128 is in row 12 and column 8, it is addressed as "(12,8)"), the information placed on display list storage subsystem to represent trapezoid 505 is as follows:

byte for pixels (12,1) through (12,8): 00000110 byte for pixels (13,1) through (13,8): 00001111

For relatively small trapezoids, this pixel-by-pixel representation is found to be more compact and faster to process than the representation discussed in connection with FIGS. 1 through 4, and is certainly more compact than conventional representations.

Those skilled in the art will recognize that the apparatus and method of representing small trapezoids by pixels discussed in connection with FIGS. 5 and 6 may readily be adapted to pixel representations of other small figures simply by choosing an appropriate threshold value in which a pixel-based representation provides performance and memory advantages over a conventional representation.

From the above description, it will be apparent that the invention disclosed herein provides a novel and advantageous digital printing system and process which conserves memory and increases processing speed by representing selected trapezoids in a compact manner. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A process of drawing a convex polygon on a computer output device in response to a command generated by a computer, the process comprising the steps of:

creating a pixel-based intermediate representation of said convex polygon;

determining a change in slope over a portion of said intermediate representation;

selectively drawing said polygon on said output device using a first final representation of said convex polygon in response to the results of said step of determining said change in slope indicating said change in slope exceeding a predetermined threshold; and selectively drawing said convex polygon on said output device using a second final representation of said polygon in response to the results of said step of determining said change in slope indicating said change in slope not exceeding the predetermined threshold.

2. A process of drawing a trapezoid on a computer output device in response to a command generated by a computer, the process comprising the steps of:

(a) receiving said command from said computer;

(b) rendering said received command into a number M of rows of pixels representative of said trapezoid;

(c) determining a y coordinate vertically locating a first one of said rows;

(d) determining, for each one of said rows, an x1 coordinate locating the left-most pixel of said row and an x2 coordinate locating the right-most pixel of said row;

(e) determining, for each one of said rows except a last one of said rows, an x1 offset representative of a difference between said x1 coordinate for said one row and a corresponding x1 coordinate for an immediately adjacent row;

(f) determining, for each one of said rows except said last row, an x2 offset representative of a difference between said x2 coordinate for said one row and a corresponding x2 coordinate for said immediately adjacent row;

(g) selecting a representation for the trapezoid as follows:

(1) representing the trapezoid by each of said rows, in response to said x1 and x2 offsets not being within predetermined x1 and x2 ranges over all of said rows exclusive of a subset of said rows;

(2) representing the trapezoid by said subset of said rows, and by a representation of a sub-trapezoid formed by removing said subset of said rows from said rows, in response to said x1 and x2 offsets being within said predetermined x1 and x2 ranges over all of said rows exclusive of said subset of rows, but not being within said predetermined x1 and x2 ranges over all of said rows inclusive of said subset of rows;

(3) representing the trapezoid by the number M, the x1, x2 and y coordinates of said first row, and said x1 and x2 offsets, in response to equality of said x1 offsets over said rows and equality of said x2 offsets over said rows;

(4) representing the trapezoid by the number M, the x1, x2 and y coordinates of said first row, a minimum of each of the x1 and x2 offsets, a set of x1 deltas indicative of a difference between said x1 minimum and said x1 offsets for each of said rows, and a set of x2 deltas indicative of a difference between said x2 minimum and said x2 offsets for each of said rows, in response to said x1 offsets being within said predetermined x1 range over said rows and said x2 offsets being within said predetermined x2 range over said rows; and (h) drawing said trapezoid in response to the results of step (g).

3. A process as in claim 2, wherein said sub-trapezoid has a number N of rows and step (g) (2) further comprises the substep of selecting a representation for said sub-trapezoid as follows:

(a) representing the sub-trapezoid by the number N, the x1, x2 and y coordinates of a first row of said subtrapezoid, and said x1 and x2 offsets for rows corresponding to said sub-trapezoid, in response to equality of said x1 offsets over rows corresponding to said sub-trapezoid and equality of said x2 offsets over rows corresponding to said sub-trapezoid; and (b) representing the sub-trapezoid by the number N, the x1, x2 and y coordinates of said first row of said subtrapezoid, a minimum of each of the x1 and x2 offsets for rows corresponding to said sub-trapezoid, said x1 deltas for rows corresponding to said sub-trapezoid, and said x2 deltas for rows corresponding to said sub-trapezoid, in response to said x1 offsets being within said predetermined x1 range over said rows corresponding to said sub-trapezoid and said x2 offsets being within said predetermined x2 range over said rows corresponding to said sub-trapezoid.

4. A process of drawing a polygon on a computer output device in response to a command generated by a computer, the process comprising the steps of:

determining size-related characteristics of said polygon;

selectively representing said polygon using a first representation in response to the results of said step of determining indicating said size-related characteristics not exceeding a threshold set of size-related characteristics; and selectively representing said polygon using a second representation in response to the results of said step of determining indicating said size-related characteristics exceeding said threshold set of size-related characteristics.

5. A process of drawing a polygon on a computer output device in response to a command generated by a computer, the process comprising the steps of:

determining size-related characteristics of said polygon; and selectively representing said polygon as a map of pixels in response to the results of said step of determining indicating said size-related characteristics not exceeding a threshold set of size-related characteristics.

6. A system for displaying a trapezoidal image represented by image data in a computer, comprising:

interpreter means disposed to receive the image data and produce a plurality of graphic primitives therefrom, each representing a specific shape at a specific location;

a display list storage area;

trapezoid processor means, receiving from the interpreter means a graphic primitive corresponding to said trapezoidal image, creating, in response to characteristics of said trapezoidal image, a compact representation of said trapezoidal image, and storing said compact representation in said display list storage area;

a display driver coupled to the display list storage area for receiving therefrom and processing said compact representation; and display means coupled to the display driver for producing the trapezoidal image responsive to the processing by the display driver.

7. A system as in claim 6, wherein said trapezoidal image is representable as a number M of pixel rows including a top row having a vertical coordinate y, a left-most pixel with horizontal coordinate x1, a right-most pixel with horizontal coordinate x2, and a plurality of lower pixel rows, each of said lower pixel rows having a left-most pixel horizontally offset from a left-most pixel of an immediately adjacent row by an x1 offset and further having a right-most pixel horizontally offset from a right-most pixel of an immediately adjacent row by an x2 offset, the compact representation created by said trapezoid processing means comprising:

(i) a plurality of pixel row representations, in response to said x1 and x2 offsets not being within a predetermined range over all of said rows exclusive of a subset of said rows;

(ii) a pixel row representation of said subset of rows, and a sub-trapezoid representation of said pixel rows exclusive of said subset of rows, in response to said x1 and x2 offsets being within a predetermined range over all of said rows exclusive of said subset of rows, but not being within said predetermined range over all of said rows inclusive of said subset of rows;

(iii) the number M, said x1, x2 and y coordinates of said top row, and said x1 and x2 offsets, in response to equality of said x1 offsets over said rows and equality of said x2 offsets over said rows; and (iv) the number M, said x1, x2 and y coordinates of said top row, a minimum of each of said x1 and x2 offsets, a set of x1 deltas indicative of a difference between said x1 minimum and said x1 offsets over said rows, and a set of x2 deltas indicative of a difference between said x2 minimum and said x2 offsets over said rows, in response to said x1 offsets being within said predetermined x1 range over said rows and said x2 offsets being within said predetermined x2 range over said rows.

8. A system as in claim 6, wherein said trapezoidal image is representable as a plurality of individual pixels, the compact representation created by said trapezoid processing means comprising a plurality of representations of said individual pixels, in response to selected dimensions of said trapezoid not exceeding a set of threshold dimensions.

* * * * *